UNITED STATES PATENT OFFICE.

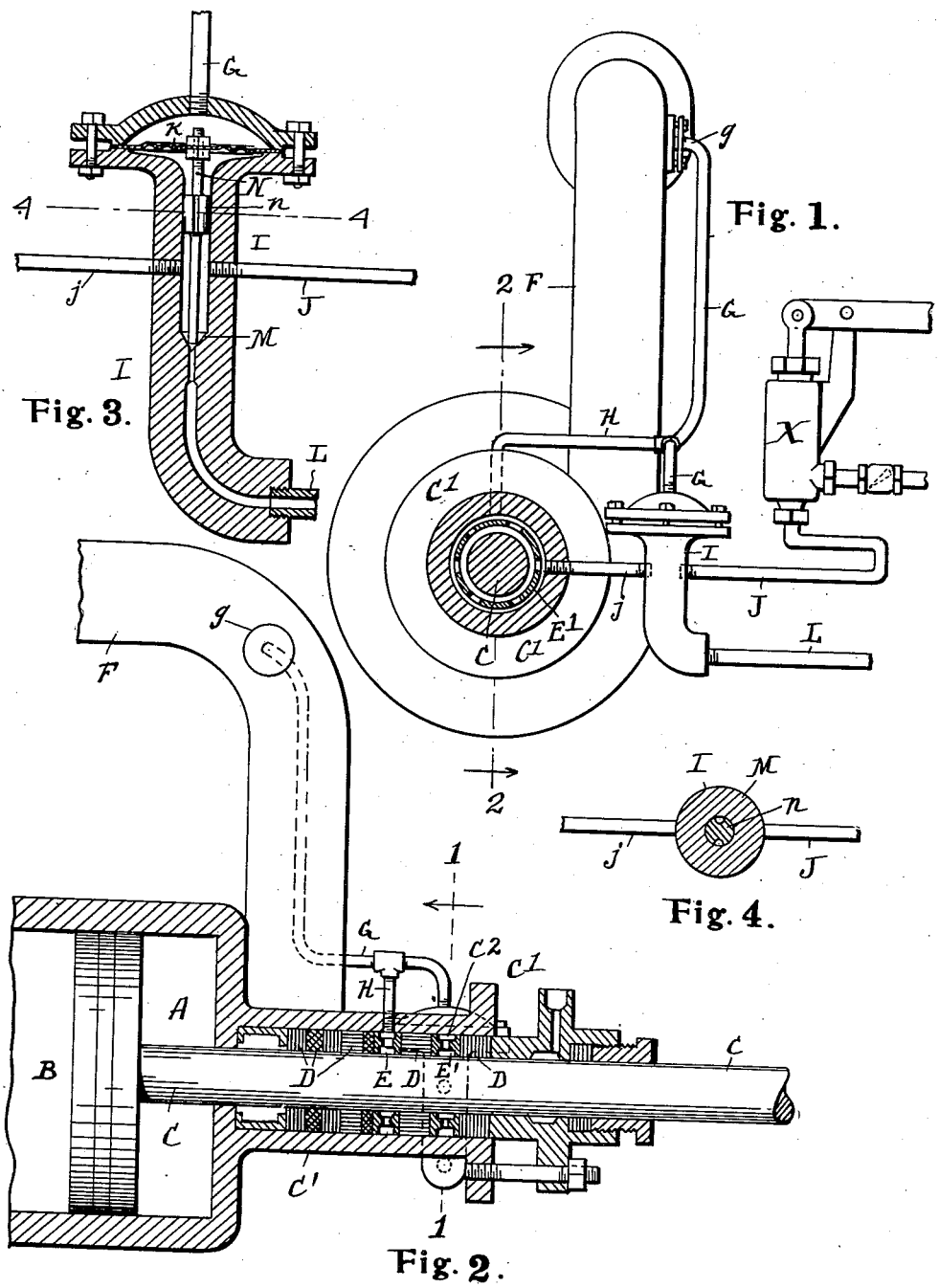

JAMES D. CAMPBELL, OF DETROIT, MICHIGAN.

MEANS FOR PACKING AMMONIA-CYLINDERS.

1,005,596.  Specification of Letters Patent.  Patented Oct. 10, 1911.

Application filed December 14, 1910. Serial No. 597,319.

*To all whom it may concern:*

Be it known that I, JAMES D. CAMPBELL, a citizen of the United States, residing at Detroit, county of Wayne, State of Michigan, have invented a certain new and useful Improvement in Means for Packing Ammonia-Cylinders, and declare the following to be a full, clear, and exact description of the same, such as will enable others skilled in the art to which it pertains to make and use the same, reference being had to the accompanying drawings, which form a part of this specification.

My invention relates to means for packing ammonia cylinders, and consists in the improvements hereinafter described and pointed out in the claims.

In the accompanying drawings:—Figure 1, is a section of one end of an ammonia cylinder embodying my invention and adjacent parts. Fig. 2, is a section on the line 2—2 of Fig. 1 looking from the left of said figure. Fig. 3, is a detail central section of the valve casing I. Fig. 4, is a section on the line 4—4 of Fig. 3.

A, is the cylinder; B, the piston therein, and C, the piston rod which extends through a stuffing box $C^1$, $C^1$.

D, D, D, indicate packing material in the stuffing box $C^1$.

E, $E^1$, indicate metallic rings having packing material between them and upon each side of them.

F, is the intake pipe through which ammonia gas is drawn into the cylinder A.

I, is a valve casing having a flexible diaphragm K therein from which depends the valve rod N which rests upon a valve seat M at its lower end.

$n$, is an enlargement of the rod N which fits into a cylindrical passage in the casing I to guide the rod N in its motion.

G, is a pipe communicating with the intake pipe F at $g$ and with the space around the ring E by a branch pipe H. The pipe G also communicates with the casing I above the diaphragm K.

L, is a return pipe by which the oil passes back to the oil pump (not shown). The pipe L communicates with the casing I below the valve seat M and upon the opposite side of said valve seat to that at which the diaphragm K and the rod N is located.

X indicates a force pump for oil.

J, is a pipe leading from the force pump for the oil, to the interior of the valve casing I between the valve seat M and the diaphragm K.

$j$, is a pipe communicating with the valve casing I between the valve seat M and the diaphragm K and with the space around the ring $E^1$ which ring is outside of the ring E and separated therefrom by packing material.

The operation of the above described apparatus is as follows:—The pressure of the ammonia in the intake pipe F is maintained in the space surrounding the ring E because such space communicates with the pipe F by the pipes G and H. The pressure of the ammonia in the pipe F is maintained constant upon the upper side of the diaphragm K by the pipe G communicating with the casing I above said diaphragm. The pressure of oil below the diaphragm K is kept constant at two or three pounds, above the pressure of the ammonia in the pipe F because the area acted upon by the oil in the casing is less by the area of the valve M than is the area acted upon by the ammonia from the intake pipe. Thus there is kept a constant pressure of oil in the space surrounding the ring $E^1$ which is two or three pounds in excess of the pressure surrounding the ring E so that the stuffing box is kept sealed by the oil between said rings, the tendency of the flow of the oil being inward. The valve, casing, and connections constitute a differential pressure valve.

What I claim is:—

1. In an apparatus of the kind described, an intake pipe, a stuffing box, means for putting one portion of the interior of said stuffing box into communication with the intake pipe, and means for maintaining an oil pressure somewhat in excess of the pressure in the intake pipe at a portion of said stuffing box outside of the first mentioned portion.

2. In an apparatus of the kind described, a cylinder having an intake pipe, a piston and piston rod, a stuffing box surrounding said rod, a pipe forming a communication between said intake pipe and a portion of the interior of said stuffing box, a valve casing I having a diaphragm K therein, a rod extending from said diaphragm and seating against a valve seat, an oil pipe communicating with said casing between said valve seat and diaphragm and with a portion of said stuffing box outside of the first named portion, means for forcing oil through said pipe into said casing, a passage connecting said valve casing with the intake pipe upon the side of said diaphragm opposite to that upon which said valve seat is located, and a return pipe for oil leading from said casing below said oil pipe.

3. In an apparatus of the kind described, the combination of a cylinder, a piston therein, a piston rod, a stuffing box surrounding said rod, an inner ring E in said stuffing box, and an outer ring $E^1$ in said stuffing box, an intake pipe leading to said cylinder, a pipe forming a communication between the space surrounding the ring E and the intake pipe, a valve adapted to maintain differential pressures communicating with said intake pipe and with a space surrounding the ring $E^1$, substantially as and for the purpose described.

4. In an apparatus of the kind described, the combination of a cylinder, a piston therein, a piston rod, a packing box surrounding said piston rod, an inner ring E in said packing box, and an outer ring $E^1$ in said packing box, an intake pipe to said cylinder, a pipe forming a communication between said intake pipe and the space around the ring E, a valve casing I having a diaphragm K therein, a rod extending from said diaphragm adapted to seat upon a valve seat in said casing, a passage forming a communication between said valve casing, between said diaphragm and said valve seat, and communicating with the space around the ring $E^1$, means for forcing oil into said valve casing between said diaphragm and said valve seat, a passage forming a communication between said valve casing on the side of said diaphragm opposite to said valve seat and with the intake pipe, and a passage leading from said casing below said valve seat.

In testimony whereof, I sign this specification in the presence of two witnesses.

JAMES D. CAMPBELL.

Witnesses:
VIRGINIA C. SPRATT,
ELLIOTT J. STODDARD.